United States Patent [19]

Hochwald et al.

[11] Patent Number: 6,058,105

[45] Date of Patent: May 2, 2000

[54] MULTIPLE ANTENNA COMMUNICATION SYSTEM AND METHOD THEREOF

[75] Inventors: Bertrand M. Hochwald; Thomas Louis Marzetta, both of Summit, N.J.

[73] Assignee: Lucent Technologies Inc., Murray Hill, N.J.

[21] Appl. No.: 08/938,168

[22] Filed: Sep. 26, 1997

[51] Int. Cl.[7] .............................. H04B 1/02; H04B 1/04; H04B 7/00

[52] U.S. Cl. ........................... 370/310; 455/103; 342/367

[58] Field of Search ..................................... 370/277, 280, 370/310, 326, 329, 334, 315, 316, 323, 325; 455/103, 132, 272, 562; 342/354, 367

[56] References Cited

U.S. PATENT DOCUMENTS

| | | | |
|---|---|---|---|
| 3,177,488 | 4/1965 | Friis ......................................... | 342/365 |
| 3,646,443 | 2/1972 | Bickford et al. .......................... | 325/56 |
| 5,592,490 | 1/1997 | Barratt et al. ............................ | 370/310 |

FOREIGN PATENT DOCUMENTS 07736638A  5/1997  European Pat. Off. .......... H04B 7/08

OTHER PUBLICATIONS

"Parallel Additive Gaussian Noise Channels," by Robert G. Gallager, *Information Theory And Reliable communication* MIT. 1968, pp. 343–345

"Capacity of Multi-antenna Gaussian Channels," by I. Emre Telatar, *AT&T Bell Laboratories Technical Memorandum*, Document No. BL011217–950615–07TM, Nov. 13,1991.

U.S. Patent Application, "Wireless Communications System Having A Layered Space–Time Architecture Employing Multi–Element Antennas," Gerard J. Foschini, Filed Jul. 1, 1996, Serial No. 08/673981.

*Primary Examiner*—Michael Horabik
*Assistant Examiner*—Kevin C. Harper
*Attorney, Agent, or Firm*—Julio A. Garceran

[57] ABSTRACT

A communications system achieves high bit rates over an actual communications channel between M transmitter antennas of a first unit and N receiver antennas of a second unit, where M or N>1, by creating virtual sub-channels from the actual communications channel. The multiple antenna system creates the virtual sub-channels from the actual communications channel by using propagation information characterizing the actual communications channel at the first and second units. For transmissions from the first unit to the second unit, the first unit sends a virtual transmitted signal over at least a subset of the virtual sub-channels using at least a portion of the propagation information. The second unit retrieves a corresponding virtual received signal from the same set of virtual sub-channels using at least another portion of said propagation information.

36 Claims, 5 Drawing Sheets

MULTIPLE ANTENNA COMMUNICATION SYSTEM AND METHOD THEREOF

BACKGROUND OF THE INVENTION

1. Field of the Invention

This invention relates to wireless communication systems and, more particularly, to a multiple antenna communication system.

2. Description of Related Art

The ultimate bit rate at which a digital wireless communication system may communicate data may be derived using Shannon's approach to information theory (commonly referred to as the Shannon limit). The ultimate bit rate is based on a number of different parameters, including: the total radiated power at the transmitter; the number of antennas at the transmitter and receiver; bandwidth; noise power at the receiver; and the characteristics of the propagation environment. For wireless transmission using multiple antennas at the transmitter and/or receiver in a so-called Rayleigh fading environment, the ultimate bit rate could be enormous, for example, hundreds of bits per second per Hz for a system employing 30 antennas at both the transmitter and receiver and experiencing an average signal-to-noise ratio of 16 dB.

A need exists for a wireless communications system which achieves high bit rates in a cost effective and relatively simple manner.

SUMMARY OF THE INVENTION

The present invention involves a communications system that achieves high bit rates over an actual communications channel between M transmitter antennas of a first unit and N receiver antennas of a second unit, where M or N>1, by creating virtual sub-channels from the actual communications channel. The multiple antenna system creates the virtual sub-channels from the actual communications channel by using at the first and second units propagation information characterizing the actual communications channel. For transmissions from the first unit to the second unit, the first unit sends a virtual transmitted signal over at least a subset of the virtual sub-channels using at least a portion of the propagation information. The second unit retrieves a corresponding virtual received signal from the same set of virtual sub-channels using at least another portion of said propagation information.

In general, a propagation matrix of propagation coefficients characterizes the propagation of communication signals between the transmitting antenna(s) of the first unit and the receiving antenna(s) of the second unit. By knowing the propagation characteristics of the actual communications channel (multiple-antenna channel), the multiple antenna system can decompose the actual communications channel into multiple virtual sub-channels. For transmissions from the first unit to the second unit, both the first unit and the second unit obtain propagation information which characterizes the transmissions from the first unit to the second unit. In certain embodiments, the first unit obtains at least a portion of the propagation information, and the second unit obtains at least another portion of the propagation information. Using the respective portions of the propagation information, the first and second units cooperatively render the actual communications channel into virtual sub-channels, thereby achieving high bit rate or throughput in a relatively simple manner.

In certain embodiments, the first and second units obtain the propagation matrix as the propagation information for transmissions from the first unit to the second unit. Initially, the first unit and second units obtain the propagation matrix by an exchange of signals. For example, the first unit transmits training signals to the second unit. From the training signals as transmitted and the training signals as received over the actual communications channel, the propagation matrix can be determined. Once the propagation matrix is determined, each unit can perform a singular value decomposition of the propagation matrix. The singular value decomposition of the propagation matrix yields the propagation matrix as the product of three factors D, $\Phi$ and $\psi^+$, where D is a diagonal matrix and $\Phi$ and $\psi^+$ are two unitary matrices with the superscript "+" denoting a conjugate transpose. The singular value decomposition serves to diagonalize the propagation matrix. The number of nonzero diagonal elements in the diagonal matrix D corresponds to the number of parallel independent virtual sub-channels for the actual communications channel. In some embodiments, for transmissions from the first unit to the second unit, the first unit obtains at least a portion of the propagation information which includes the diagonal matrix D and the unitary matrix $\Phi$. The first unit provides the diagonal matrix D to a channel coder/modulator to encode and modulate an incoming bit or information stream onto the independent virtual sub-channels according to the values of the diagonal matrix D to produce a virtual transmitted signal. As such the diagonal matrix D can provide relative scaling of the bit rate. The first unit then performs a unitary transformation on the virtual transmitted signal by multiplying the virtual transmitted signal with the conjugate transpose of the unitary matrix $\Phi$ to produce the actual transmitted signal.

The second unit obtains at least another portion of the propagation information which includes the unitary matrix $\psi^+$ and the diagonal matrix D in certain embodiments. The second unit performs a unitary transformation on the actual received signal by multiplying the actual received signal with the unitary matrix $\psi$ to produce a virtual received signal. The multiplications at the first and second units by the unitary matrices establish a virtual channel from the actual communications channel between the virtual transmitted signal and the virtual received signal which can be treated as parallel independent virtual sub-channels. The second unit provides the diagonal matrix D to a channel decoder/demodulator to decode and demodulate the virtual received signal according to the matrix D to produce an information stream. Thus, the multiple antenna system provides high capacity by effectively providing parallel independent sub-channels within the same frequency band. The multiple antenna system also provides enhanced performance because the multiple antenna system transmits bits on the virtual sub-channels relative to the values of the diagonal matrix D, thereby the stronger virtual sub-channels are used to transmit more information.

BRIEF DESCRIPTION OF THE DRAWINGS

Other aspects and advantages of the present invention may become apparent upon reading the following detailed description and upon reference to the drawings in which.

DETAILED DESCRIPTION OF THE DRAWINGS

An illustrative embodiment of the multiple antenna communication system according to the principles of the present invention is described below as the multiple antenna communication system might be implemented to provide high bit rate and enhanced performance. The multiple antenna system accomplishes this by using multiple antenna arrays at the transmitter and/or receiver and taking advantage of the propagation characteristics obtained for the multiple-antenna channel between the antenna(s) of a first unit and the antenna(s) of a second unit. By knowing certain propagation characteristics of the actual communications channel (multiple-antenna channel) at the first unit and the second unit, the multiple antenna system can achieve high bit rates by having the first unit and second unit cooperatively decompose the actual communications channel into multiple virtual sub-channels. For transmissions from the first unit to the second unit, the first and second units obtain at least respective portions of the propagation information characterizing the transmissions from the first unit to the second unit. The first and second units use at least their respective portions of the propagation information to decompose the actual communications channel into multiple virtual sub-channels over which communication signals are transmitted. As such, the multiple antenna communication system achieves high bit rates in a relatively simple manner without increasing total power or bandwidth by using the virtual sub-channels within the same frequency band. Additionally, the multiple antenna system provides enhanced performance by transmitting more bits over the stronger sub-channels as determined by the propagation information.

Figure 1:
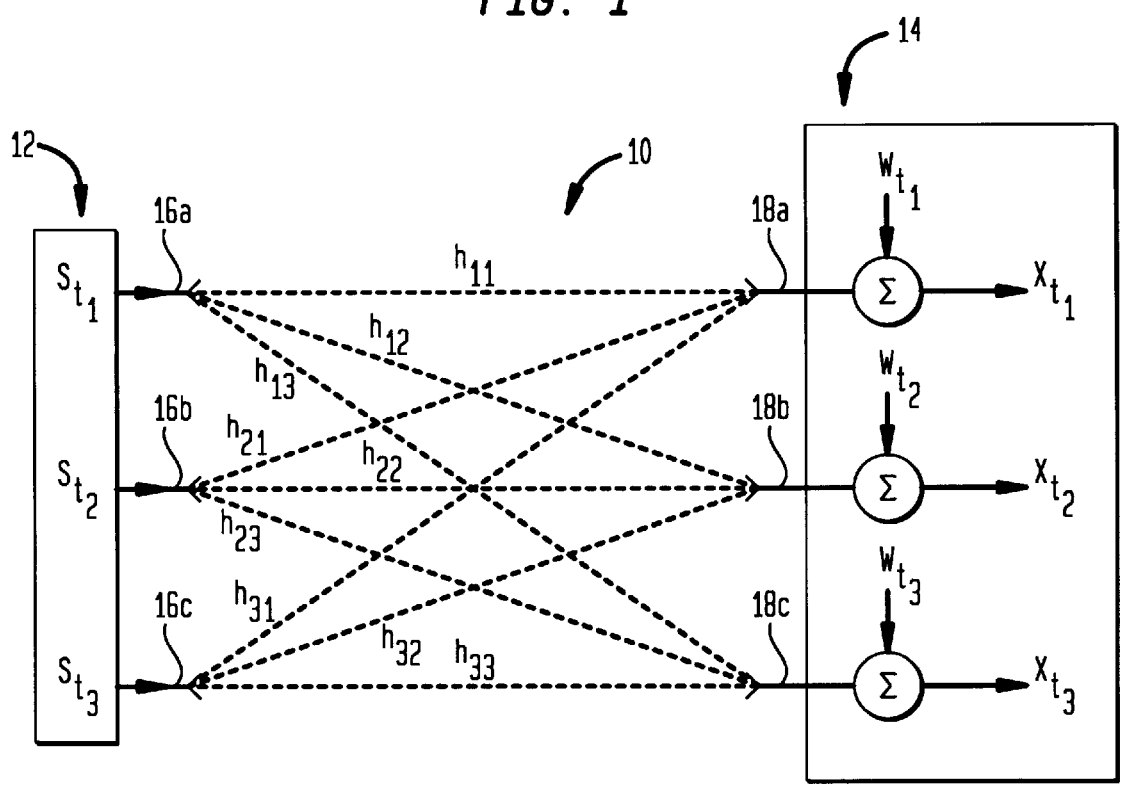
FIG. 1 shows a baseband representation of a multiple antenna channel or the actual communications channel used according to the principles of the present invention.

FIG. 1 shows a baseband representation for an actual communications channel 10 over which a first unit 12 transmits the RF signals corresponding to the components $s_{t1}$, $s_{t2}$ and $s_{t3}$ of an actual transmitted signal on carriers of the same frequency over respective multiple antennas 16a–c to a second unit 14. In this particular embodiment, the first unit 12 has three antennas 16a–c, and the second unit 14 has three antennas 18a–c. The second unit 14 receives the RF signals at the respective receive antennas 18a–c corresponding to the components $x_{t1}$, $x_{t2}$ and $x_{t3}$ of the actual received signal. Each receive antenna 18a–c responds to each transmit antenna 16a–c through a complex-valued, scalar propagation coefficient $h_{mn}$, where m designates the respective transmit antenna 16a–c and n designates the respective receive antenna 18a–c. As such, the actual received signal $x_{t1}$, $x_{t2}$ and $x_{t3}$ can be characterized by the following:

$$x_{t1} = h_{11} \times s_{t1} + h_{21} \times s_{t2} + h_{31} \times s_{t3} + w_{t1}$$

$$x_{t2} = h_{12} \times s_{t1} + h_{22} \times s_{t2} + h_{32} \times s_{t3} + w_{t2}$$

$$x_{t3} = h_{13} \times s_{t1} + h_{23} \times s_{t2} + h_{33} \times s_{t3} + w_{t3},$$

where $\{w_{t1}, w_{t2}, w_{t3}\}$ are receiver noise added at the second unit 14. In vector notation, $\underline{x}_t = \underline{s}_t \times H + \underline{w}_t$ where $\underline{x}_t = [x_{t1}, x_{t2}, x_{t3}]$, $\underline{s}_t = [s_{t1}, s_{t2}, s_{t3}]$, $\underline{w}_t = [w_{t1}, w_{t2}, w_{t3}]$, and the propagation matrix can be represented as:

$$H = \begin{matrix} h11 & h12 & h13 \\ h21 & h22 & h23 \\ h31 & h32 & h33 \end{matrix}.$$

In this particular embodiment, the second unit 14 can transmit signals in the reverse direction to the first unit 12. The second unit 14 can use its receive antennas 18a–c to transmit the signals, and the first unit 12 can use its transmit antennas 16a–c to receive the signals. If the same frequency is used in both directions (using a time division duplex (TDD) scheme in certain bi-directional communications embodiments), the propagation coefficients for transmissions from the second unit 14 to the first unit 12 can be considered equal to the propagation coefficients for transmissions from the first unit 12 to the second unit 14 (according to the reciprocity principle), so $H_{2to1} = H^T_{1to2}$, where the superscript "T" denotes the transpose. If different frequencies are used in both directions (using a frequency division duplex scheme), the propagation coefficients for the signals propagating in both directions are determined. Using an appropriate training and set-up scheme, the first unit 12 and the second unit 14 can both learn the first unit 12 to second unit 14 propagation coefficients and the second unit 14 to first unit 12 propagation coefficients. For example, the units 12 and 14 could transmit known training signals over one antenna at a time and/or transmit training signals using orthogonal signals transmitted simultaneously over all respective antennas.

For ease of discussion, the multiple antenna scheme according to the principles of the present invention is discussed with particular reference to transmissions from the first unit 12 to the second unit 14. It should be understood that the multiple antenna scheme can be applied to both uni-directional or bi-directional communications. In this particular embodiment, both units 12 and 14 perform a singular value decomposition (SVD) of the 3×3 propagation matrix H obtained by both units 12 and 14. In this particular embodiment, the SVD of H yields $H = \Phi \times D \times \psi^+$, where D is a 3×3 real-valued, nonnegative, diagonal matrix, $$D = \begin{matrix} d11 & 0 & 0 \\ 0 & d22 & 0 \\ 0 & 0 & d33 \end{matrix},$$

and $\Phi$ and $\psi^+$ are 3×3 complex unitary matrices with the superscript "+" denoting the "conjugate transpose." The columns of a unitary matrix have unit length and are mutually orthogonal. Multiplying a vector by a unitary matrix does not change the length of the vector but merely changes the direction of the vector. The inverse of a unitary matrix is equal to the conjugate transpose of the matrix, for example, $\Phi^+ \times \Phi = I$ or for l=1 to 3, $\Sigma \Phi_{1i}^* \times \Phi_{1j}$ is equal to 1 if i=j and is equal to 0, if i≠j, where the superscript "*" denotes the "complex-conjugate."

The second unit 14 uses the matrix $\psi$ to multiply the received signal $\underline{x}_t$ by the 3×3 unitary matrix $\psi$ to obtain $\underline{r}_t = [r_{t1}, r_{t2}, r_{t3}] = \underline{x}_t \times \psi$. The first unit 12 uses the matrix $\Phi$ to transform the virtual transmitted signal $\underline{y}_t$ into the actual transmitted signal $\underline{s}_t$ by letting the actual transmitted signal $\underline{s}_t$ be equal to the conjugate transpose of the 3×3 unitary matrix $\Phi$ times the virtual transmitted signal $\underline{y}_t$, $\underline{s}_t = \underline{y}_t \times \Phi^+$ where $\underline{y}_t = [y_{t1}, y_{t2}, y_{t3}]$. The multiplications by the unitary matrices are invertible operations, so there is no loss of information. In effect, a link is established between the virtual transmitted signal $\underline{y}_t$ and the virtual received signal $\underline{r}_t$, where $$\begin{aligned} \underline{r}_t = \underline{x}_t \times \psi &= (\underline{s}_t \times H + \underline{w}_t) \times \psi \\ &= (\underline{y}_t \times \Phi^\dagger \times H + \underline{w}_t) \times \psi \\ &= \underline{y}_t \times \Phi^\dagger \times H \times \psi + \underline{w}_t \times \psi \end{aligned}$$

Substituting $H = \Phi \times D \times \psi^\dagger$ in the above expression gives:

$$\begin{aligned} \underline{r}_t &= \underline{y}_t \times \Phi^\dagger \times (\Phi \times D \times \psi^\dagger) \psi + \underline{w}_t \times \psi \\ &= \underline{y}_t \times D + \underline{v}_t, \text{ where } \underline{v}_t = \underline{w}_t \times \psi \end{aligned}$$

Figure 2:
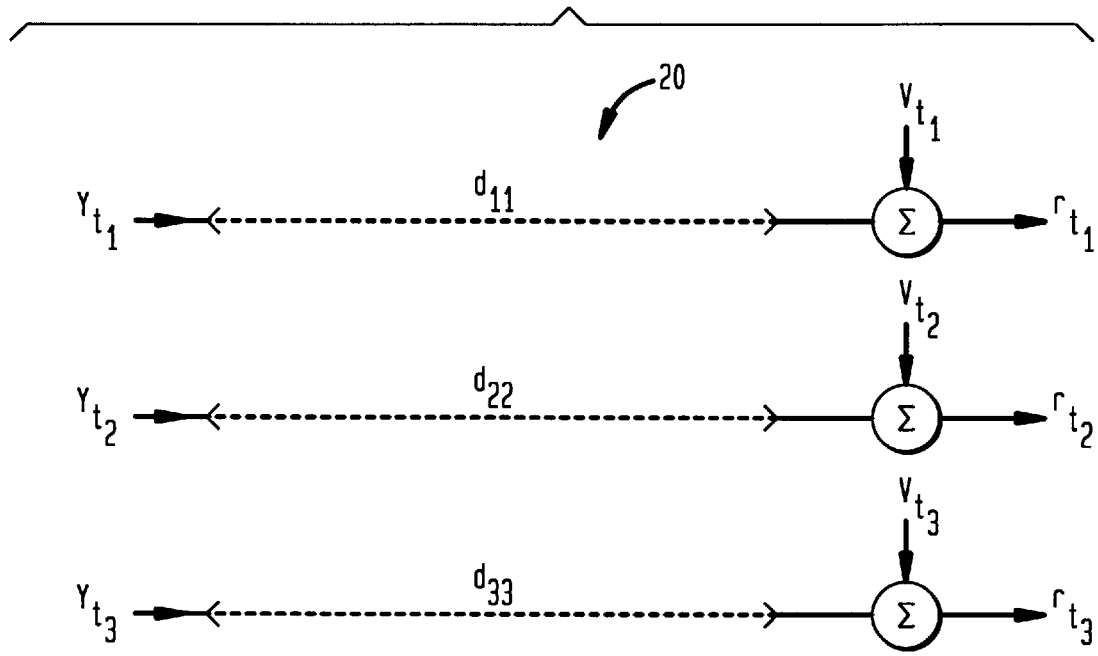
FIG. 2 shows a baseband representation of the virtual sub-channels derived from the actual communications channel according to certain principles of the present invention.

Thus, the original link 10 between $\underline{s}_t$ and $\underline{x}_t$ is equivalent to a much simpler virtual link 20 between $\underline{y}_t$ and $\underline{r}_t$ as shown in FIG. 2. In the actual communications channel, every one of the N receiver antennas responds to every one of the M transmitter antennas. The advantage of the virtual link or channel 10 is that it comprises virtual sub-channels, wherein each of a plurality of virtual receiver antennas responds to exactly one respective virtual transmitter antenna. In effect, the cross-coupled actual communications channel 10 of FIG. 1 can be treated as the three parallel, independent virtual sub-channels $d_{11}$, $d_{22}$ and $d_{33}$ shown in FIG. 2 according to the principles of the present invention.

The first and second units 12 and 14 can determine the respective propagation information needed to establish the virtual sub-channels between the first unit 12 and the second unit 14 in alternative ways. For example, since the matrix $HH^+ = \Phi \times D \times D^+ \times \Phi^+$, the first unit 12 and/or the second unit 14 can determine the unitary matrix $\Phi^+$ from the eigenvectors of the matrix $HH^+$ and the diagonal matrix D from the eigenvalues of $HH^+$. Additionally, since $H^+H = \psi \times D^+ \times D \times \psi^+$, the first unit 12 and/or the second unit 14 can determine the unitary matrix $\psi$ from the eigenvectors of $H^+H$ and the diagonal matrix D from the eigenvalues of $H^+H$. The diagonal matrix can be determined by using the squareroots of the eigenvalues of $HH^+$ or $H^+H$.

Figure 3:
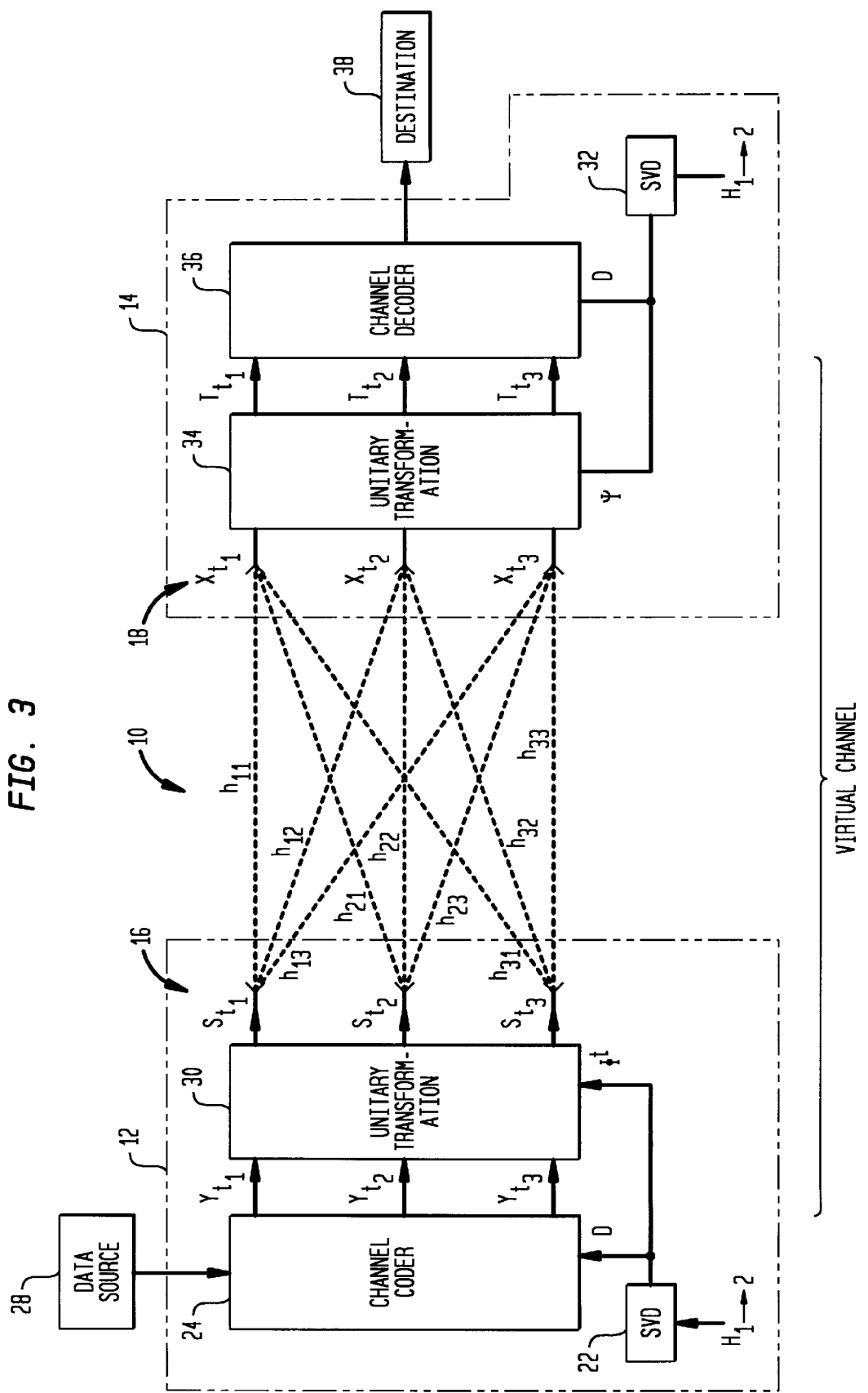
FIG. 3 shows a block diagram of an embodiment of the multiple antenna system according to the principles of the present invention.

FIG. 3 shows an embodiment of the multiple antenna communication system according to certain principles of the present invention for transmissions between the first unit 12 and the second unit 14. In this particular embodiment, the first unit 12 is shown as transmitting, and the second unit 14 is shown as receiving. For transmissions in the reverse direction, the first unit 12 would typically include receiver components (not shown) as will be described below for the second unit 14, and the second unit 14 would typically include transmitter components (not shown) as described below for the first unit 12. In accordance with certain embodiments of the present invention, the first unit 12 uses the multiple antenna array 16 for transmitting and receiving communication signals, and the second unit 14 use the multiple antenna array 18 for transmitting and receiving communication signals.

In this particular embodiment for transmissions from the first unit 12 to the second unit 14, the propagation of the signals over the actual communications channel 10 has a baseband characterization that comprises a matrix of complex-valued (having real and imaginary parts) propagation coefficients between the transmitting antennas 16a–c and the receiving antennas 18a–c. In this particular embodiment, the first unit 12 and the second unit 14 learn the values of the propagation matrix and determine the appropriate propagation information to establish the virtual sub-channels between the first unit 12 and the second unit 14. Alternatively, the first unit 12 and/or the second unit 14 do not learn the propagation matrix. Instead, the units 12 and 14 obtain and/or determine some portion of the propagation information, such as the diagonal matrix D, and the first unit 12 obtains and/or determines other propagation information, such as the unitary matrix $\Phi^+$ while the second unit 14 obtains and/or determines the unitary matrix $\psi$.

To learn the propagation matrix (or derive the appropriate propagation information for certain embodiments) for communications from the first unit 12 to the second unit 14, the first unit 12 can send training signals to the unit 14 from which the unit 14 determines or estimates the propagation matrix (or propagation information). The unit 14 can then send the propagation matrix (or propagation information) to the unit 12 by using a conventional communication scheme employing one or multiple antennas at the first and second units 12 and 14. Alternatively, the unit 14 can send the propagation matrix (or propagation information) to the unit 12 using other communication links, such as a phone line. Additionally, the unit 14 can simply send back to the unit 12 the training signals received from the unit 12, and the unit 12 determines the propagation matrix (or propagation information). The unit 12 then sends the propagation matrix (or propagation information) to the unit 14.

Likewise, to learn the propagation matrix (or propagation information) for signals propagating from the unit 14 to the unit 12, the unit 14 sends training signals to the unit 12 from which the unit 12 determines or estimates the propagation matrix (or propagation information). Once again, as discussed for determining the propagation matrix (or propagation information) for transmissions from the unit 12 to the unit 14, the unit 12 can provide and/or derive different forms or amounts of propagation information to the unit 14 depending on the particular embodiment and using different communication schemes.

Two-way transmissions between the unit 12 and the unit 14 can be accomplished using a variety of schemes, such as time division duplex (TDD) or frequency division duplex (FDD). TDD has the advantage that the channel characteristics for signals propagating from the first unit 12 to the second unit 14 are generally the same as the channel characteristics for signals propagating from the second unit 14 to the second station 12. In the case of TDD, both units 12 and 14 occupy the same frequency band. As such, the propagation matrix for transmissions from the first unit 12 to the second unit 14 are considered transposes of each other due to the principle of reciprocity as described in D. S. Jones, "Acoustic and Electromagnetic Waves," Oxford University Press, 1989, pp. 63–64 and no further exchange of training signals is required (although updates to the propagation matrix or to propagation information can be performed). In FDD for certain embodiments, the second unit 14 transmits to the first unit 12 the propagation matrix (or propagation information) for transmissions from the first unit 12 to the second unit 14. Additionally, after the appropriate set-up or training scheme is performed for transmissions from the second unit 14 to the first unit 12, the first unit 12 can transmit to the second unit 14 the propagation matrix (or propagation information) for transmissions from the second unit 14 to the first unit 12.

With particular reference to FIG. 3, since the first and second units 12 and 14 know the propagation matrix (or propagation information which can be derived from the propagation matrix or propagation information which can be used to derive the propagation matrix or other propagation information), the units 12 and 14 can effectively decompose the complicated multiple-antenna channel 10 into multiple independent virtual sub-channels using the propagation matrix (or respective propagation information). In this particular embodiment, the units 12 and 14 derive the multiple virtual sub-channels from the multiple-antenna channel 10 by using propagation information derived from a singular value decomposition of the propagation matrix. After learning the propagation matrix for transmissions from the first unit 12 to the second unit 14, the first unit 12 provides the propagation matrix H to a singular value decomposition block 22. The singular value decomposition 22 performs a singular value decomposition of the propagation matrix H which produces some propagation information, including the diagonal matrix D and two unitary matrices $\Phi$ and $\psi^+$ where the superscript $^+$ denotes a conjugate transpose. The number of nonzero diagonal elements in the matrix D represents the number of parallel independent virtual sub-channels.

For transmissions from the first unit 12 to the second unit 14 in this particular embodiment, the first unit 12 provides the diagonal matrix D to a channel coder/modulator 24 to encode and modulate an incoming information stream from an information source 28. The channel coder/modulator 24 encodes and modulates the information stream to form a plurality of sub-information streams depending on the nonzero values of the diagonal matrix D to produce the virtual transmitted signal. The virtual transmitted signal can be represented as a vector, the respective components of which are transmitted onto respective virtual sub-channels. In this particular embodiment, a unitary transformation block 30 performs a unitary transformation on the virtual transmitted signal by multiplying the virtual transmitted signal with the conjugate transpose of the unitary matrix $\Phi$. Finally, the first unit 12 uses the results of the unitary transformation 30 to produce the baseband version of the actual transmitted signal.

In this particular embodiment, the second unit 14 also provides the propagation matrix H to a singular value decomposition 32 and uses the results from the singular value decomposition 32 to perform a unitary transformation 34 on the actual received signal. In this particular embodiment, the unitary transformation block 34 multiplies the actual received signal with the unitary matrix $\psi$ to produce a virtual received signal. In this particular embodiment, the multiplications by the unitary matrices at the unitary transformations 30 and 34 tend not to amplify noise and are invertible operations, so information should not be lost. The multiplications by the unitary matrices establishes a link, which can be treated as parallel independent virtual sub-channels, between the virtual transmitted signal at the first unit 12 and the virtual received signal at the second unit 14. The second unit 14 provides the diagonal matrix D to a channel demodulator/decoder 36 which uses the diagonal matrix D to decode and demodulate the virtual received signal vector to form a single information stream which corresponds to the information stream provided to the channel coder/modulator 24 at the first unit 12. Additionally, the first unit 12 can use the diagonal matrix D to provide enhanced performance by sending more bits on the stronger virtual sub-channels according to the nonzero values of the diagonal matrix. If the amplitude of a nonzero value of the matrix D is below a certain level, the multiple antenna system can advantageously not use the corresponding virtual sub-channel, thereby a subset of the stronger virtual sub-channels can be used. As such, the multiple antenna system achieves higher data rates in a narrow bandwidth by effectively providing parallel independent virtual sub-channels within the same frequency band and enhanced performance.

Figure 4:
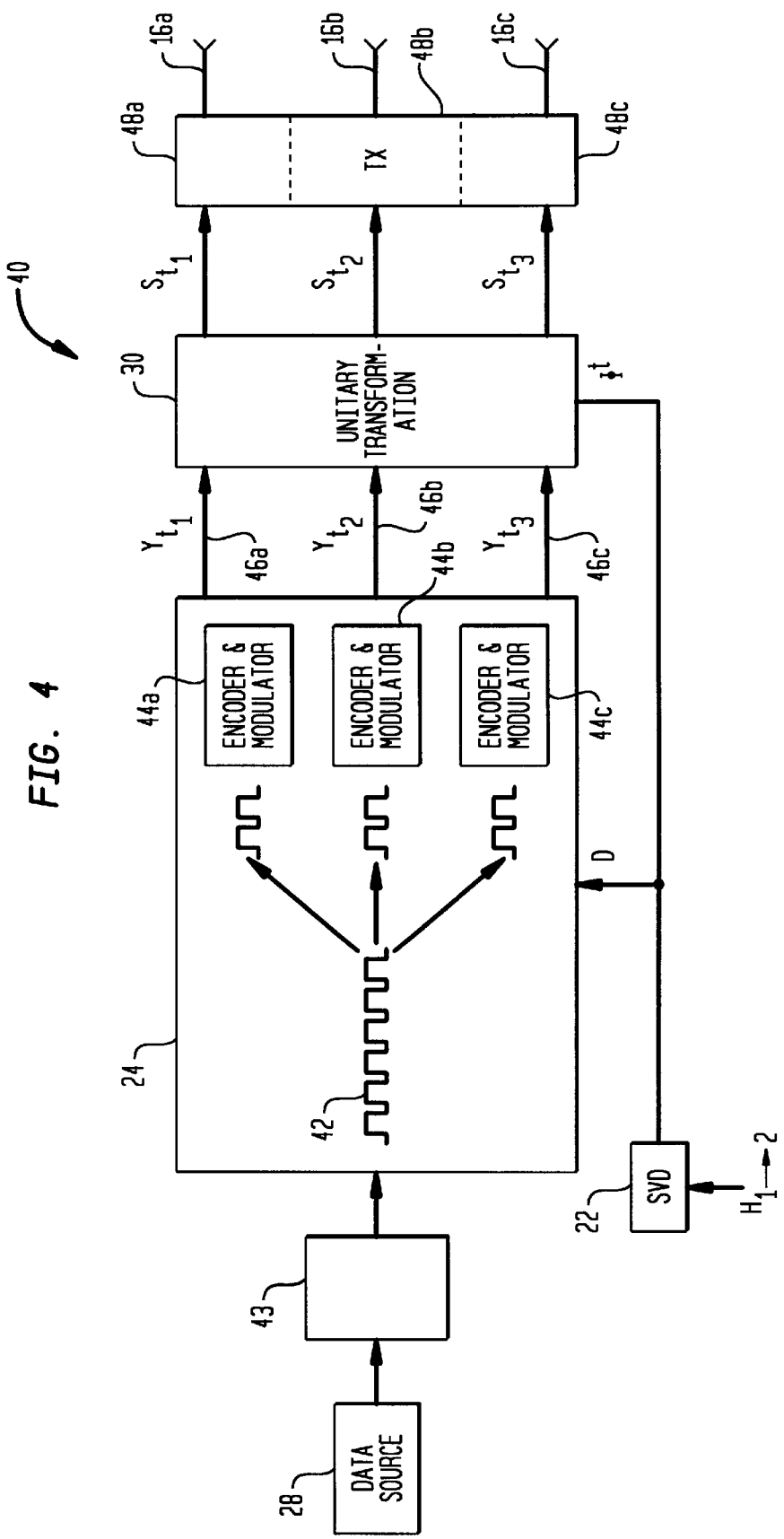
FIG. 4 shows a block diagram of an embodiment of a multiple antenna transmitter according to certain principles of the present invention.

FIG. 4 shows a block diagram of a transmitter 40 having the multiple antenna array 16 with three antennas 16a–c for use in any unit 12 or 14 according to the principles of the present invention. For ease of discussion, the transmitter 40 will be described as being included in the unit 12 (FIG. 3) because the multiple-element antenna communication system according to the principles of the present invention has been described in the context of transmissions from the first unit 12 (FIG. 3) to the second unit 14 (FIG. 3). The units 12 and 14 (FIG. 3) in this particular embodiment, however, can both transmit and receive signals according to the principles of the present invention. In doing so, the units 12 and 14 exchange training signals to estimate the propagation matrices (or propagation information which can be the actual training signals in certain embodiments) for communications between them. After learning the propagation matrix H for signals propagating from the first unit 12 (FIG. 3) to the second unit 14 (FIG. 3), the transmitter 40 provides the propagation matrix H to the singular value decomposition block 22.

The singular value decomposition block 22 performs a singular value decomposition of the propagation matrix H (which can be done for any H) to yield $H=\Phi \times D \times \psi^+$, where D is a real-valued, non-negative, diagonal matrix and $\Phi$ and $\psi^+$ are unitary matrices. The number of nonzero diagonal elements is less than or equal to the smaller of the number of antennas 16 at the transmitter 40 and at the second unit 14 (FIG. 3) and represents the number of parallel independent virtual sub-channels that are available within the same frequency band. Additionally, the sizes of the nonzero diagonal elements indicate the relative signal-to-noise ratios of the virtual sub-channels. In accordance with an aspect of the present invention, the transmitter 40 allocates power to the virtual sub-channels depending on the relative signal-to-noise ratios of the sub-channels as determined by the values of the nonzero diagonal elements of the diagonal matrix D. Thus, the better sub-channels can get more transmitter power and carry more data. In accordance with particular embodiments of this aspect of the present invention, the transmitter 40 has a total power restriction and generally allocates power to the different sub-channels to provide a higher, reliable bit rate. In doing so, the transmitter 40 can allocate power to the different subchannels using a version of a Water Pouring algorithm as disclosed by Robert G. Gallager, "Information Theory and Reliable Communication," John Wiley & Sons, 1968, pp. 343–345.

The transmitter 40 receives information signals from the information source 28, and the information stream is input into a buffer 43. According to certain aspects of the present invention, if all of the non-zero diagonal elements of the diagonal matrix D are equal or relatively similar in this particular embodiment, the channel coder/modulator 24 can direct the first bit of a bit stream 42 from the buffer 43 to encoder/modulator 44a, the second bit of the bit stream 42 to encoder/modulator 44b, and the third bit of the bit stream 42 to encoder/modulator 44c. If the amplitude of the nonzero diagonal value of the matrix D corresponding to a first virtual sub-channel is twice as large as the nonzero diagonal values of the matrix D corresponding to the second and third virtual sub-channels in this particular example, the channel coder/modulator 24 could send the first two bits of the bit stream 42 to the encoder/modulator 44a and the next two bits of the bit stream 42 being split between the encoder/modulator 44b and the encoder/modulator 44c. To combat the effects of noise, the channel coder/modulator 24 can use ordinary error-correcting codes of the types typically used for conventional additive Gaussian noise channels as would be understood by one of ordinary skill in the art in combination with conventional modulation schemes, such as Quadrature Phase Shift Keying (QPSK) modulation.

In this particular embodiment, the channel coder/modulator 24 produces three signal vector components $y_{t1}$, $y_{t2}$ and $y_{t3}$ of the virtual transmitted signal. The components of the virtual transmitted signal are digital complex values which can be fixed point or floating point depending on the implementation. The three components $y_{t1}$, $y_{t2}$ and $y_{t3}$ of the virtual transmitted signal from the encoder/modulators 44a–c are provided to the unitary transformation block 30. The unitary transformation block performs a 3×3 matrix multiplication on the components $y_{t1}$, $y_{t2}$ and $y_{t3}$ using a unitary matrix $\Phi^+$. The result of the unitary transformation 30 is an actual transmitted signal having components $s_{t1}$, $s_{t2}$ and $s_{t3}$ which are sent to respective transmit circuits 48a–c and converted as necessary to the radio frequency (RF) domain. In this particular embodiment, the transmit circuitry 48a–c modulates the components $s_{t1}$, $s_{t2}$ and $s_{t3}$ of the actual transmitted signal onto the same carrier and transmits each component $s_{t1}$, $s_{t2}$ and $s_{t3}$ of the actual transmitted signal over a respective antenna 16a–c.

Figure 5:
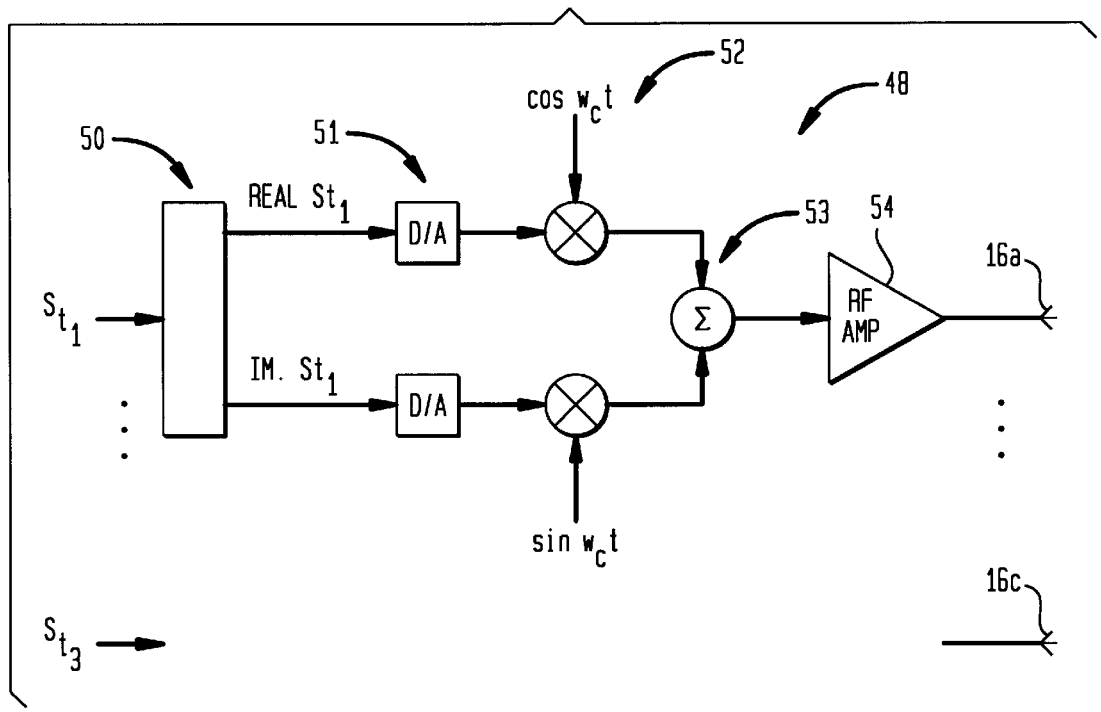
FIG. 5 shows a block diagram of a particular embodiment of the transmit circuitry for the transmitter of FIG. 4.

FIG. 5 shows a general diagram for an embodiment of the transmit circuitry 48. In this particular embodiment, each components $s_{t1}$, $s_{t2}$ and $s_{t3}$ of the virtual transmitted signal vector is split into real and imaginary parts by block 50. The real and imaginary parts of each component $s_{t1}$, $s_{t2}$ and $s_{t3}$ are input to digital-to-analog converters 51. Multipliers 52 multiply the analog real part of each component $s_{t1}$, $s_{t2}$ and $s_{t3}$ by $\cos\omega_c t$ with $\omega_c$ being the carrier frequency (radians/second) and multiply the analog imaginary part of each component $s_{t1}$, $s_{t2}$ and $s_{t3}$ by $\sin\omega_c t$. Afterward, respective real and imaginary parts of each component $s_{t1}$, $s_{t2}$ and $s_{t3}$ are added together by summers 53 to produce an RF signal for each component $s_{t1}$, $s_{t2}$ and $s_{t3}$ on the same carrier frequency $\omega_c$. Each RF signal is then amplified by respective RF power amplifiers 54 and transmitted over respective antennas 16a–c in this particular embodiment. Alternative embodiments for the transmit circuitry 48 are possible.

Figure 6:
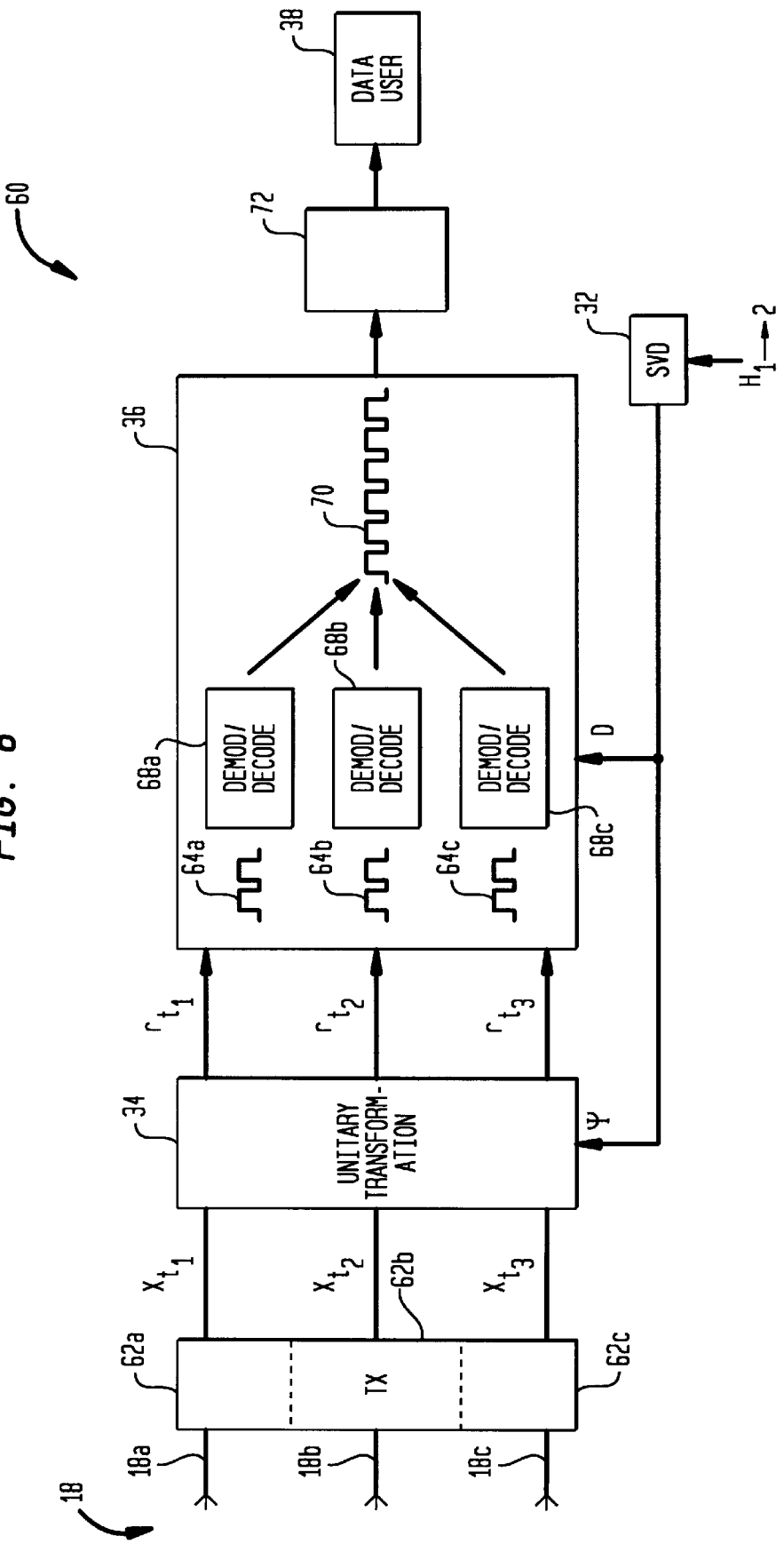
FIG. 6 shows a block diagram of an embodiment of a multiple antenna receiver according to certain principles of the present invention.

FIG. 6 shows a block diagram of a receiver 60 having the multiple antenna array 18 with three antennas 18a–c for use in any unit 12 or 14 (FIG. 3) according to the principles of the present invention. For ease of discussion, the receiver 60 will be described as being included in the second unit 14 (FIG. 3) because the multiple-element antenna communication system according to the principles of the present invention has been described in the context of transmissions from the first unit 12 (FIG. 3) to the second unit 14 (FIG. 3). As mentioned above, the units 12 and 14 (FIG. 3) in this particular embodiment can both transmit and receive signals according to the principles of the present invention.

As described above for this particular embodiment, the receiver 60 receives training signals from the transmitter 40 (FIG. 4) and estimates the propagation matrix H for communications from the transmitter 40 (FIG. 4) to the receiver 60. After learning the propagation matrix H for signals propagating from the transmitter 40 (FIG. 4) to the receiver 60, the receiver 60 provides the propagation matrix H to the singular value decomposition block 32. As in the transmitter 40 (FIG. 4), the singular value decomposition block 32 performs a singular value decomposition of the propagation matrix H to yield $H=\Phi \times D \times \psi^+$, where D is a real-valued, non-negative, diagonal matrix and $\Phi$ and $\psi^+$ are 3×3 complex unitary matrices with the superscript "+" denoting the "conjugate transpose."

The receiver 60 receives the signals propagating from the transmitter 40 (FIG. 4) through the multiple antenna array 18, and receiver circuits 62a–c process the signals received from the respective antennas 18a–c down to baseband. In this particular embodiment, the actual received signal vector $\underline{x}_t$ is digitized before being provided to the unitary transformation block 34. The unitary transformation block 34 uses its propagation information derived from the propagation matrix H to multiply the actual received signal $\underline{x}_t$ by the 3×3 unitary matrix $\psi$ to obtain a virtual received signal $\underline{r}_t=[r_{t1}, r_{t2}, r_{t3}]=\underline{x}_t \times \psi$. The channel demodulator/decoder 36 receives the virtual received signal $\underline{r}_t$ from the unitary transformation block 34 with respective parallel components $r_{t1}$, $r_{t2}$ and $r_{t3}$. The components $r_{t1}$, $r_{t2}$ and $r_{t3}$ are provided to respective parallel demodulators/decoders 68a–c. The parallel demodulators/decoders 68a–c demodulate and decode the virtual received signal $\underline{r}_t$ according to the modulation and coding scheme used by the transmitter 40 (FIG. 4).

Using the nonzero diagonal values of the diagonal matrix D from the SVD block 32 and reflecting the use of the matrix D in the transmitter 40 (FIG. 4), the channel demodulator/decoder 36 constructs a single stream 70 of information bits from the parallel components $r_{t1}$, $r_{t2}$ and $r_{t3}$ of the virtual received signal. As such, the diagonal matrix D used to construct the information stream 70 from the parallel streams 64a–c in the receiver 60 is the same matrix D used to separate the single stream 42 (FIG. 4) into parallel streams 46a–c (FIG. 4) in the transmitter 40 (FIG. 4). The information stream 70 is then output to its destination 38 before which the information stream 70 can pass through additional processing or circuitry 72 which can include a data buffer.

Figure 7:
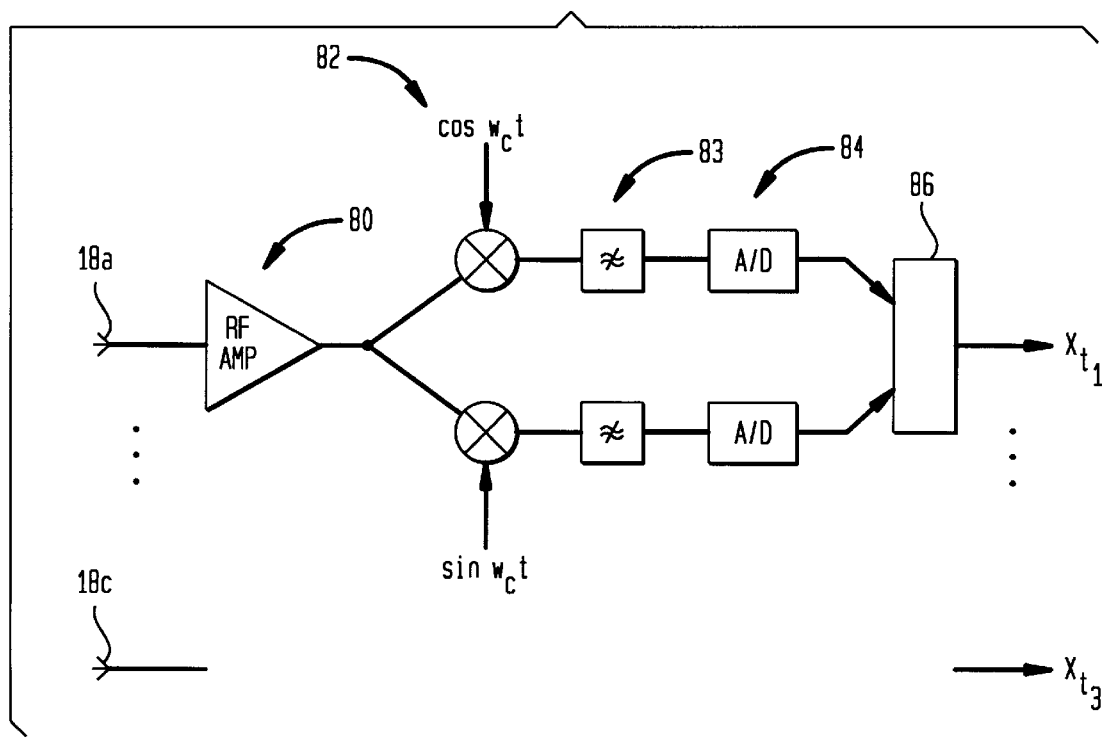
FIG. 7 shows a block diagram of an embodiment of the receive circuitry of the receiver of FIG. 6.

FIG. 7 shows a general diagram for an embodiment of the receive circuitry 62. In this particular embodiment, the transmitted RF signals from the transmit circuitry 48 (FIG. 5) are received at the antennas 18a–c. The RF signals received at each antenna 18a–c are amplified by respective pre-amplifiers 80. Multipliers 82 multiply the respective RF signals by $\cos\omega_c t$ and $\sin\omega_c t$ with $\omega_c$ being the carrier frequency to produce analog versions of the real and imaginary parts of the components of the actual received signal which were modulated onto carriers of the same frequency $\omega_c$. The analog versions of the real and imaginary parts for each component of the actual received signal are low pass filtered by filters 83 and provided to analog-to-digital converters 84 to produce digital versions of the real and imaginary parts of each component. Combiner 86 combine the real and imaginary parts of each component to produce the components $x_{t1}$, $x_{t2}$ and $x_{t3}$ of the actual received signal as complex digital values. In this particular embodiment as described above, the components $x_{t1}$, $x_{t2}$ and $x_{t3}$ of the actual received signal are provided to the unitary transformation block 34 (FIG. 6). The receive circuitry 62 is shown as a homodyne receiver, but alternative embodiments for the receive circuitry 62 are possible.

In accordance with certain embodiments of the present invention, the multiple antenna system updates the propagation matrix or information periodically or continuously as operating conditions change. As such, if an antenna 16 (FIG. 4) or 18 becomes unavailable, the multiple antenna system can update the propagation matrix(ices) or information at the two units 12 and 14, thereby maintaining the communications between the units 12 and 14 and still providing a high bit rate. Additionally, depending on the conditions of the virtual sub-channels (which can be measured by the nonzero diagonal values of the diagonal matrix D), the bit rate between the two units 12 and 14 using the multiple antenna system is scaleable. Accordingly, if the signal-to-noise ratio, virtual sub-channel gain or other measurement value for a virtual sub-channel drops below a certain threshold level and/or a relative level compared to the other sub-channels, the multiple antenna system can either reduce the number of bits transmitted over the virtual sub-channel or drop the virtual sub-channel, thereby reducing the bit rate, until updates of the propagation matrix or information show that the virtual sub-channel has risen above the threshold level and/or the relative level. Furthermore, in similar fashion, the multiple antenna system according to certain principles of the present invention can allocate power to the different virtual sub-channels based on the conditions of the different virtual sub-channels as determined by the nonzero values of the diagonal matrix D or other measurement values corresponding to the virtual sub-channels.

The multiple antenna system enables an increase in bit rate without an increase in power or bandwidth as compared to single antenna systems. In certain embodiments, the propagation of the signals is modeled as flat fading (no frequency dependence to fading). Additionally, in the event of receiver noise and external interference, the multiple antenna system can use a covariance matrix or the like which characterizes the receiver noise and/or the external interference to effectively alter the propagation information or to include the covariance matrix or the like as part of the propagation information. If the elements of the propagation matrix H are statistically independent, identically distributed, with Rayleigh-distributed magnitude and uniformly distributed phase, the capacity of the channel grows linearly with the smaller of the number of transmitter and receiver antennas. Theoretically, there is no limit to the number of antennas that can be utilized in the multiple antenna system, thereby providing the potential for enormous capacities in a narrow bandwidth. For example, if 170 antennas are used at the transmitter and the receiver in a 30 kHz bandwidth with signal-to-noise ratios of 20 dB, 20 Mb/s of High Definition TV (HDTV) may be sent over the multiple antenna channel after being decomposed to 170 virtual sub-channels according to the principles of the present invention.

The multiple-element antenna system according to the principles of the present invention can achieve such high bit rates in the narrow bandwidth and in a simple manner by using multiple antennas at both the transmitter and receiver to decompose the multiple antenna channel into multiple independent virtual sub-channels. A pair of units using the multiple antenna system use a distinct band of frequencies for communicating with each other over the multiple-antenna channel. Thus, different pairs of units can be frequency division multiplexed. A pair of units can take a variety of forms, such as units which can handle voice and/or data in a wireless local area network. Additionally, the multiple antenna system can provide security in communications between a pair of units because the propagation information characterizing the actual communications channel between the pair of units is unique to that pair. As such, even if a third party obtained the propagation information for the pair, it would be difficult for the third party to intercept the communications between the pair because the propagation information for an actual communications channels between the third party and each of the pair of units would be different.

In addition to the embodiments described above, alternative configurations of the multiple antenna system according to the principles of the present invention are possible which omit and/or add components and/or use variations or portions of the described multiple antenna system. For example, the multiple antenna system has been described with three antennas at both the first unit and the second unit to provide three virtual sub-channels, but different numbers of antennas can be employed at the first unit and the second unit. Additionally, the multiple antenna system has been described as being employed in terms of communications over a multiple antenna channel from the first unit to the second unit. The multiple antenna system, however, includes units which transmit and/or receive according to the principles of the present invention. In certain embodiments, the units use the same multiple antennas for both transmission and reception. Alternative embodiments of units employing the multiple antenna system are possible, however, which use a subset of the multiple antennas for transmission and/or reception depending on the number of antennas at the unit on the other end of the multiple antenna channel or upon the values of the diagonal matrix in the reverse direction.

The above-described multiple antenna system has been described as comprising several components or blocks, but it should be understood that the multiple antenna system and portions thereof can be implemented in application specific integrated circuits, software-driven processing circuitry, or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

We claim:

1. A method for transmitting communication signals, said method comprising:

sending by a first unit a virtual transmitted signal over at least a subset of virtual sub-channels of an actual communications channel using at least a portion of propagation information characterizing said actual communications channel between M transmitter antennas of said first unit and N receiver antennas of a second unit, where M or N>1.

2. The method of claim 1 further comprising:

transmitting by said first unit training signals to said second unit; and obtaining said at least a portion of said propagation information by said first unit from said second unit.

3. The method of claim 1 further comprising:

transmitting by said first unit training signals to said second unit; and obtaining by said first unit training signals as received at said second unit for determining said at least a portion of said propagation information.

4. The method of claim 1 wherein said sending further including:

transforming said virtual transmitted signal into an actual transmitted signal using said at least a portion of said propagation information; and transmitting said actual transmitted signal over said M transmitter antennas onto said actual communications channel.

5. The method of claim 4 wherein said transmitting further including:

transmitting each component of said actual transmitted signal using a respective one of said M transmitter antennas.

6. The method of claim 4 further including:

producing a unitary matrix from said at least a portion of said propagation information.

7. The method of claim 6 wherein said producing further includes:

performing a singular value decomposition of a propagation matrix H which characterizes said actual communications channel.

8. The method of claim 6 wherein said producing further including:

using eigenvectors of a matrix derived from a propagation matrix H which characterizes said actual communications channel.

9. The method of claim 6 further including:

using said unitary matrix to perform a unitary transformation of said virtual transmitted signal into said actual transmitted signal; and transmitting each component of said actual transmitted signal onto carriers having the same frequency.

10. The method of claim 1 further including:

receiving by the first unit an information stream from an information source; and separating said information stream into a plurality of signal streams using at least a portion of said propagation information to form said virtual transmitted signal.

11. The method of claim 10 further including:

producing a diagonal matrix D from at least said portion of said propagation information with the nonzero diagonal values corresponding to said virtual sub-channels of said actual communications channel.

12. The method of claim 11 wherein said producing further includes:

performing a singular value decomposition of a propagation matrix H which characterizes said actual communications channel.

13. The method of claim 12 wherein said producing further including:

using squareroots of eigenvalues of a matrix derived from a propagation matrix H which characterizes said actual communications channel.

14. The method of claim 10 wherein said separating further including:

using values of a diagonal matrix D from at least said portion of said propagation information to separate said information stream into a plurality of signal streams according to said values of said diagonal matrix D.

15. The method of claim 14 further including:

using said values of said diagonal matrix D to allocate power for transmitting each component of said virtual transmitted signal.

16. A method of receiving communication signals, said method comprising:

retrieving by said second unit a virtual received signal from at least a subset of virtual sub-channels of an actual communications channel using at least a portion of propagation information characterizing said actual communications channel between M transmitter antennas of a first unit and N receiver antennas of said second unit, where M or N>1 and said first unit includes at least a portion of said propagation information.

17. The method of claim 16 further comprising:

receiving by said second unit training signals from said first unit; and determining said at least a portion of said propagation information by said second unit using said training signals received by said second unit.

18. The method of claim 16 further comprising:

receiving by said second unit training signals from said first unit; and sending training signals as received by said second unit to said first unit;

determining by said first unit said at least a portion of said propagation information using said training signals as received by said second unit; and sending said at least a portion of said propagation information by said first unit to said second unit.

19. The method of claim 16 wherein said retrieving further including:

receiving an actual received signal from said actual communications channel on said N receiver antennas; and transforming said actual received signal into said virtual received signal using said at least a portion of said propagation information.

20. The method of claim 19 wherein said retrieving further including:

receiving each component of said actual received signal using a respective one of said N receiver antennas.

21. The method of claim 19 further including:

producing a unitary matrix from said at least a portion of said propagation information.

22. The method of claim 21 wherein said producing further includes:

performing a singular value decomposition of a propagation matrix H which characterizes said actual communications channel.

23. The method of claim 21 wherein said producing further including:

using eigenvectors of a matrix derived from a propagation matrix H which characterizes said actual communications channel.

24. The method of claim 21 further including:

receiving each component of said actual received signal from carriers having the same frequency; and using said unitary matrix to perform a unitary transformation of said actual received signal into said virtual received signal.

25. The method of claim 16 further including:

combining components of said virtual received signal to provide an information stream using at least a portion of said propagation information.

26. The method of claim 25 wherein said combining further including:

producing a diagonal matrix D from at least said portion of said propagation information.

27. The method of claim 26 wherein said producing further includes:

performing a singular value decomposition of a propagation matrix H which characterizes said actual communications channel.

28. The method of claim 26 wherein said producing further including:

using squareroots of eigenvalues of a matrix derived from a propagation matrix H which characterizes said actual communications channel.

29. The method of claim 25 wherein said combining further including:

using values of a diagonal matrix D from at least said portion of said propagation information to combine said virtual received signal into an information stream according to said values of said diagonal matrix D.

30. A method of communicating over an actual communications channel, said method comprising:

creating virtual sub-channels from said actual communications channel between M transmitter antennas of a first unit and N receiver antennas of a second unit, where M or N>1, by using at said first unit and said second unit propagation information characterizing said actual communications channel;

sending by said first unit a virtual transmitted signal over at least a subset of said virtual sub-channels using at least a portion of said propagation information; and retrieving by said second unit a virtual received signal from said at least a subset of said virtual sub-channels using at least another portion of said propagation information.

31. A transmitter for transmitting information signals comprising:

a plurality of antennas;

processing circuitry configured to obtain propagation information for an actual communications channel between said plurality of antennas and a plurality of receiver antennas, said processing circuitry comprising a channel coder configured to receive an information signal stream and at least a portion of said propagation information, said channel coder further configured to separate said information signal stream using said at least a portion of said propagation information to form a virtual transmitted signal of components corresponding to sub-channels of said communications channel, said processing circuitry further configured to perform a transformation on said virtual transmitted signal using at least another portion of said propagation information to form an actual transmitted signal; and transmit circuitry coupled to said plurality of antennas and configured to transmit each component of said actual transmitted signal through a respective one of said plurality of antennas on carriers of the same frequency.

32. A receiver for receiving information signals comprising:

a plurality of antennas;

receive circuitry coupled to said plurality of antennas and configured to receive each component of an actual received signal through a respective one of said plurality of antennas; and processing circuitry configured to obtain propagation information for a communications channel between said plurality of antennas and a plurality of transmitter antennas at a transmitter having at least a portion of said propagation information, said processing circuitry further configured to perform a transformation on said actual received signal using at least a portion of said propagation information to form a virtual received signal, said processing circuitry comprising a channel decoder configured to receive said virtual received signal and at least another portion of said propagation information, said channel decoder further configured to combine said virtual received signal into an information stream using said at least another portion of said propagation information.

33. A method for transmitting communication signals on an actual communications channel between M transmitter antennas of a first unit and N receiver antennas of a second unit, where M or N>1, said method comprising:

producing by said first unit using at least a portion of propagation information characterizing said actual communications channel an actual transmitted signal of components for transmission over said actual communications channel to said second unit for transformation by said second unit using at least a portion of said propagation information.

34. A method of receiving communication signals from an actual communications channel between M transmitter antennas of a first unit and N receiver antennas of a second unit, where M or N>1, said method comprising:

transforming by said second unit using at least a portion of propagation information characterizing said actual communications channel a plurality of components of an actual received signal received from said actual communications channel from said first unit after being produced at said first unit using at least a portion of said propagation information.

35. A method for transmitting communication signals, said method comprising:

creating virtual sub-channels from an actual communications channel between M transmitter antennas of a first unit and N receiver antennas of a second unit, where M or N>1, by using at said first unit and said second unit at least portions of said propagation information characterizing said actual communications channel; and sending by said first unit a virtual transmitted signal over at least a subset of said virtual sub-channels using at least a portion of said propagation information.

36. A method of receiving communication signals, said method comprising:

creating virtual sub-channels from an actual communications channel between M transmitter antennas of a first unit and N receiver antennas of a second unit, where M or N>1, by using at said first unit and said second unit at least portions of said propagation information characterizing said actual communications channel; and retrieving by said second unit a virtual received signal from at least a subset of said virtual sub-channels using at least a portion of said propagation information.

* * * * *